(12) United States Patent
Matthews et al.

(10) Patent No.: US 9,106,428 B2
(45) Date of Patent: Aug. 11, 2015

(54) MULTICAST SWITCHING FOR DISTRIBUTED DEVICES

(71) Applicant: Broadcom Corporation, Irvine, CA (US)

(72) Inventors: Brad Matthews, San Jose, CA (US); Bruce Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 159 days.

(21) Appl. No.: 13/723,045

(22) Filed: Dec. 20, 2012

(65) Prior Publication Data

US 2014/0098816 A1    Apr. 10, 2014

Related U.S. Application Data

(60) Provisional application No. 61/709,849, filed on Oct. 4, 2012.

(51) Int. Cl.
*H04L 12/801* (2013.01)
*H04L 12/18* (2006.01)
(Continued)

(52) U.S. Cl.
CPC ............... *H04L 12/18* (2013.01); *H04L 49/00* (2013.01); *H04L 49/201* (2013.01); *H04L 12/40* (2013.01); *H04L 12/54* (2013.01); *H04L 12/5693* (2013.01); *H04L 12/58* (2013.01); *H04L 47/10* (2013.01);
(Continued)

(58) Field of Classification Search
CPC ......... H04L 12/18; H04L 12/40; H04L 12/54; H04L 12/5693; H04L 12/58; H04L 47/10; H04L 49/00; H04L 49/201; H04L 49/25; H04L 49/251; H04L 49/252; H04L 49/351

USPC .............. 390/390-392, 395.4, 401, 412, 413, 390/422
See application file for complete search history.

(56) References Cited

U.S. PATENT DOCUMENTS 6,049,546 A * 4/2000 Ramakrishnan .............. 370/412
6,144,668 A * 11/2000 Bass et al. ..................... 370/401
(Continued)

OTHER PUBLICATIONS

Elwalid, et al., "MATE: MPLS Adaptive Traffic Engineering", 2001, pp. 1-10.
(Continued)

*Primary Examiner* — Benjamin H Elliott, IV
*Assistant Examiner* — Eric Nowlin
(74) *Attorney, Agent, or Firm* — McDermott Will & Emery LLP

(57) ABSTRACT

A system for multicast switching for distributed devices may include an ingress node including an ingress memory and an egress node including an egress memory, where the ingress node is communicatively coupled to the egress node. The ingress node may be operable to receive a portion of a multicast frame over an ingress port, bypass the ingress memory and provide the portion to the egress node when the portion satisfies an ingress criteria, otherwise receive and store the entire frame in the ingress memory before providing the frame to the egress node. The egress node may be operable to receive the portion from the ingress node, bypass the egress memory for the portion and provide the portion to the first egress port when an egress criteria is satisfied, otherwise receive and store the entire multicast frame in the egress memory before providing the multicast frame to an egress port.

20 Claims, 7 Drawing Sheets

(51) Int. Cl.
*H04L 12/931* (2013.01)
*H04L 12/947* (2013.01)
*H04L 12/54* (2013.01)
*H04L 12/58* (2006.01)
*H04L 12/40* (2006.01)

(52) U.S. Cl.
CPC ............... *H04L 49/25* (2013.01); *H04L 49/251* (2013.01); *H04L 49/252* (2013.01); *H04L 49/351* (2013.01)

(56) References Cited

U.S. PATENT DOCUMENTS

| | | | | |
|---|---|---|---|---|
| 8,817,784 | B2* | 8/2014 | Riddoch et al. | 370/390 |
| 2002/0110120 | A1* | 8/2002 | Hagglund et al. | 370/389 |
| 2002/0118692 | A1* | 8/2002 | Oberman et al. | 370/419 |
| 2004/0196859 | A1* | 10/2004 | Benner | 370/413 |
| 2005/0058149 | A1* | 3/2005 | Howe | 370/428 |
| 2006/0114907 | A1* | 6/2006 | Wu | 370/392 |
| 2008/0273546 | A1* | 11/2008 | Johnson et al. | 370/419 |
| 2010/0238938 | A1* | 9/2010 | Zhou et al. | 370/394 |

OTHER PUBLICATIONS

"IP-Multicasting Technology Part 2: Switches vs. Routers", retrieved from <www.intelligraphics.com/ip-multicasting-technology-part-2-switches-vs-routers#IP-Multicast:_Using_> on Jul. 21, 2012, pp. 1-3, Intelligraphics Inc.

"Cut-Through and Store-and-Forward Ethernet Switching for Low-Latency Environments", 2008, pp. 1-13, Cisco Systems, Inc.

Kim, et al., "Revisiting Ethernet: Plug-and-Play Made Scalable and Efficient" (Invited Paper), 2007, pp. 1-7, Princeton University.

"A Primer on Real World High Frequency Trading Taxonomy", ARISTA at-a-glance, retrieved Jul. 2012, pp. 1-3, Arista Networks.

"Low Latency Switches Power High Frequency Trading, Ultra Low Latency Switching Inside a Collocated Network Give Program Traders a Competitive Advantage", 2010, pp. 1-4, BLADE Network Technologies, Inc.

"High-Performance Automated Trading Network Architectures", 2010, pp. 1-5, Cisco.

"Ethernet Tutorial: Network Switching", retrieved from <www.cse.cuhk.edu.hk/~cslui/CEG4430/switching.html> on Jul. 12, 2012, pp. 1-6.

"An Advanced Switch Memory Architecture", May 18-19, 2010, PowerPoint Presentation from Linley Tech Spring Conference, pp. 1-8, Fulcrum Microsystems.

Lee, "Advanced Switch Memory Architectures Improve Network Performance", retrieved from <www.eetimes.com/General/PrintView/4210220>, Oct. 28, 2010, pp. 1-7, Fulcrum Microsystems.

"Network Connectivity", Jul. 13, 2010, pp. 1-3, Intel Corporation.

"Switch Design", PowerPoint Presentation, 2009, pp. 9-1-9-47.

"Store and Forward", retrieved from <http://en.wikipedia.org/w/index,php?title=Store_and_forward&oldid=475846432>, Feb. 8, 2012, pp. 1-2.

"Cut-Through Switching", retrieved from <http://en.wikipedia.org/w/index.php?title=Cut-through_switching&oldid=466540850>, Dec. 18, 2011, pp. 1-2.

"IP Multicast", retrieved from <http://en.wikipedia.org/w/index.php?oldid=502242936> in Jul. 2012, pp. 1-8.

Yang, et al., "Design and Scalable and Multicast Capable Cut-Through Switches for High-Speed LANs", Department of Computer Science, Michigan State University, 1997, pp. 1-9.

Gerla, et al., "Multicasting in Myrinet—A High-Speed, Wormhole-Routing Network", 1996, pp. 1-5.

"Network Switching Tutorial", retrieved from <www.lantronix.com/resources/net-tutor-switching.html> on Jul. 12, 2012, pp. 1-5, Lantronix, Inc.

Cummings, et al., "FM4000 a Scalable, Low-Latency 10 GigE Switch for High-Performance Data Centers", Columbia University and IBM PowerPoint Presentation, IEEE Hot Interconnects, Aug. 2009, pp. 1-26.

"Congestion Management and Buffering in Data Center Networks", 2012, pp. 1-11, Extreme Networks, Inc.

Iyer, et al., "Techniques for Fast Shared Memory Switches", Stanford University—Stanford HPNG Technical Report TR01-HPNG-081501, Aug. 2001, pp. 1-12.

Gerla, et al., "Multicasting Protocols for High-Speed, Wormhole-Routing Local Area Networks", UCLA, 1996, pp. 1-10.

Casetti, et al., "Multicasting at the Host Interface Level in Wormhole Networks", Oct. 1998, pp. 1-8.

Chen, "Applicability of PCE for Computing Protection Paths", PowerPoint Presentation, retrieved Jul. 2012, pp. 1-16.

"Building Ultra Low Latency Financial Networks", Document version: v0.2 DRAFT, 2010, pp. 1-11, Arista Networks, Inc.

"Understanding Ingress and Egress in General (Part 1)", Tutorial from Experts Exchange, LLC, Mar. 13, 2010, pp. 1-2.

Aly, et al., "Protection Over Asymmetric Channels S-MATE: Secure Multipath Adaptive Traffic Engineering", Dec. 29, 2010, pp. 1-9.

* cited by examiner

MULTICAST SWITCHING FOR DISTRIBUTED DEVICES

CROSS-REFERENCE TO RELATED APPLICATIONS

The present application claims the benefit of U.S. Provisional Patent Application Ser. No. 61/709,849, entitled "Multicast Switching for Distributed Devices," filed on Oct. 4, 2012, which is hereby incorporated by reference in its entirety for all purposes.

TECHNICAL FIELD

The present description relates generally to switching, and more particularly, but not exclusively, to multicast switching for distributed devices.

BACKGROUND

Market demands are driving both an increase in bandwidth aggregation required for switch devices and a decrease in the multicast latency of such devices. Furthermore, in some implementations, such as High Frequency Trading (HFT) applications, switch devices may be required to handle multicast frames with minimal latency.

Switch devices may generally handle incoming frames using a store and forward switching technique or a cut-through switching technique. In the store and forward switching technique, an entire frame is received and stored by the switch before the frame is forwarded to its next destination, or destinations in the instance of a multicast frame. Since the switch receives and stores the entire frame prior to forwarding the frame, the switch can process the entire contents of the frame, e.g. the switch can verify the integrity of the frame. Thus, the store and forward switching technique may increase the reliability of the transmitted frames; however, the store and forward technique may also incur latency since the switch must wait until the entire frame is received before starting to forward the frame. In the cut-through switching technique, a switch may start forwarding a frame prior to receiving the entire frame. Since the switch starts to forward the frame before the entire frame is received, the switch may not be to verify the integrity of the frame. Thus, the cut-through switching technique may result in the propagation of invalid frames; however, the cut through switching technique may incur minimal latency relative to the store and forward switching technique since the switch can start forwarding the frame before the entire frame is received.

Accordingly, the store and forward switching technique may be suitable for some multicast traffic, such as multicast traffic for which data integrity is prioritized over latency, while the cut-through switching technique may be suitable for other multicast traffic, such as multicast traffic for which latency is prioritized over data integrity.

Some switch designs, such as Output Queued (OQ) switches, are often employed using a shared memory architecture, where all incoming frames are written into, and read out of, a single shared memory. Thus, an OQ switch with N input (or ingress) ports and N output (or egress) ports that utilizes shared memory must read N packets from the shared memory, and write N packets into the shared memory, in one packet arrival time. As such, memory throughput limitations may, in some instances, constructively limit the amount of bandwidth aggregation that can be achieved by an OQ switch. Thus, in some instances OQ switches may not be scalable to accommodate very high bandwidth aggregation.

Other switch designs, such as Combined Input and Output Queued (CIOQ) switches, utilize a separate buffer for each input and output port, along with a memory access arbitration module to arbitrate read/writes to/from each of the individual buffers. Since CIOQ switches utilize multiple independent buffers for each input and output port, instead of a single shared buffer for all of the input and output ports, a CIOQ switch may not be as limited by memory throughput limitations as an OQ switch, and therefore may be able to provide high bandwidth allocation in some instances. However, since a multicast frame is queued twice in a CIOQ switch, e.g. in a queue corresponding to the input port and in a queue corresponding to the output port, a CIOQ switch may incur considerable queue latency in some instances. Furthermore, in order for a CIOQ switch to implement the cut-through switching technique, the memory access arbitration module would need to be bypassed, which may, in some instances, result oversubscription at the output port, e.g. multiple multicast frames may arrive at the same output port simultaneously.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without one or more of these specific details. In one or more instances, well-known structures and components are shown in block diagram form in order to avoid obscuring the concepts of the subject technology.

Figure 1:
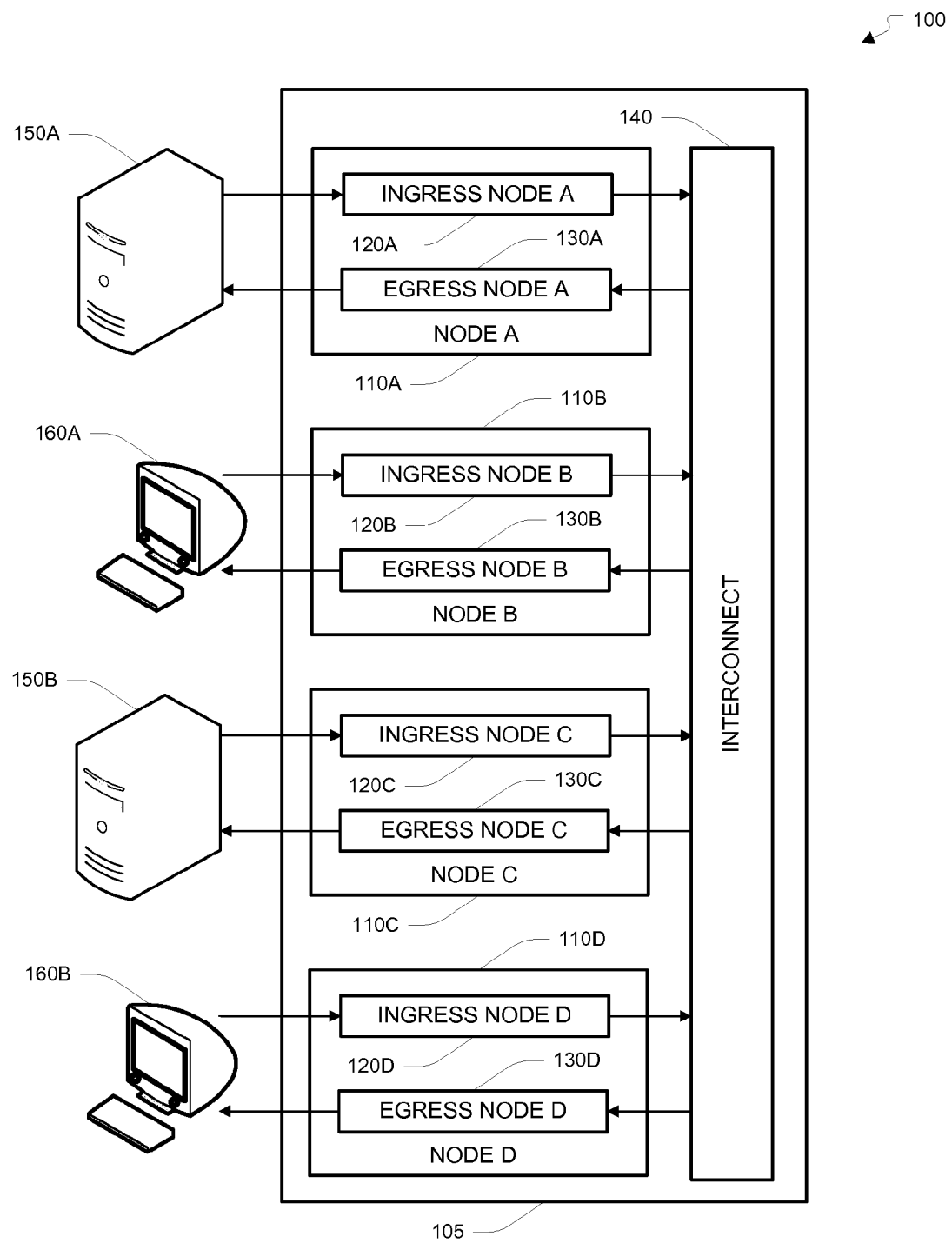
FIG. 1 illustrates an example network environment implementing a system for multicast switching for distributed devices in accordance with one or more implementations.

FIG. 1 illustrates an example network environment 100 implementing a system 105 for multicast switching for distributed devices in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 100 may include various devices, such as one or more servers 150A-B and one or more computers 160A-B. In one or more implementations, the network 100 may include a set of servers, a server bank, or a vast network of interconnected computers or network devices. In one or more implementations, the network environment 100 may include one or more other devices, such as, for example, one or more wireless telephone, mobile device or mobile phone, smart phone, communications device, tablet, personal computer (PC), set-top box (STB), personal digital assistant (PDA), palmtop computer, laptop computer, desktop computer, land-line telephone, control system, camera, scanner, facsimile machine, printer, pager, personal trusted device, web appliance, network router, switch or bridge, or any other machine or device.

One or more systems, such as the system 105, may be implemented to facilitate communication between the one or more devices of the network environment 100, such as the servers 150A-B and the computers 160A-B. Any or all of the devices of the network 100, such as any or all of the servers 150A-B and the computers 160A-B, may be connected or otherwise in communication with each other, through or using the system 105.

The system 105 includes one or more nodes 110A-D and an interconnect 140. In one or more implementations, the system may be implemented in a network device, such as a switch device. The nodes 110A-D include the ingress nodes 120A-D and the egress nodes 130A-D. The nodes 110A-D may be on one or more dies. A die may refer to a block of semiconducting material on which a given functional or integrated circuit may be fabricated. In one or more implementations, the node A 110A may represent a single die in a chip. In one or more implementations, the node A 110A may represent multiple chips in a device or system, or multiple devices in a system or chassis. The system 105 may have any number of dies and the dies may have any number of the nodes 110A-D. In one or more implementations, the ingress nodes 120A-D and/or the egress nodes 130A-D may represent a single logical entity in one or more dies. The nodes 110A-D may also be referred to as tiles. Accordingly, the ingress nodes 120A-D may also be referred to as ingress tiles, and the egress nodes 130A-D may also be referred to as egress tiles. The ingress nodes 120A-D and the egress nodes 130A-D are discussed further below with respect to FIGS. 2 and 3.

The interconnect 140 may enable communication between the ingress nodes 120A-D and the egress nodes 130A-D. In one or more implementations, the interconnect 140 may include, or may be, a fabric, such as a full mesh fabric, or any other interconnect that provides for communication between the ingress nodes 120A-D and the egress nodes 130A-D.

The nodes 110A-N of the system 105 may include, or may be associated with, one or more physical ports. The ports may be internal on a single chip or die, or the ports may be spread across multiple chips or dies. One or more devices, such as the servers 150A-B or computers 160A-B, may connect or communicate with or through the system 105 using the one or more ports of the nodes 110A-N. A node A 110A may have two ports, such that the server 150A may connect to a first port of the node 110A and another device, such as another server, may connect to the second port of node 110A. The nodes 110A-N of the system 105 may have, or be associated with, any number of ports. The ports may individually have a finite receive and transmit bandwidth, while the system 105 may have an aggregate bandwidth achieved by combining the bandwidth of the ports of the system 105. In one or more implementations, the system 105 may include four ports with a bandwidth of 500 gigabits per second, and therefore the system 105 may have an aggregate bandwidth of 2 terabits per second.

In one or more implementations, a port may be associated with one or more classes of service, or priority levels. The classes of service may have their own separate queues for data transfers to and/or from the port. In one or more implementations, a port may have eight classes of service, or priorities, and therefore eight separate data queues; however, other variations are possible.

In the system 105, data, bits of data, a data packet, a set of data, signals, a frame (referred to as "data" or "data packet"), or a multicast frame (a frame that is intended to be transmitted to multiple destinations) may arrive at or be received at or through a physical port that may logically be referred to as an ingress port. Inbound data may be processed by the ingress nodes 120A-D and therefore the ingress nodes 120A-D may be referred to as being associated with one or more ingress ports. In one or more implementations, the data packets may be large, and may arrive and/or be processed in smaller pieces (referred to in one or more implementations as data "cells," "segments," "chunks," or "portions"). The data packet may depart from the system 105 at or through a physical port that may be logically referred to as an egress port. Outbound data may be processed by the egress nodes 130A-D, and therefore the egress nodes 130A-D may be referred to as being associated with one or more egress ports. Thus, a physical port may be logically referred to as an ingress port when data is being received at or through the port, and the same physical port may also be logically referred to as an egress port when data is being transmitted at or through the port.

The ingress nodes 120A-D and the egress nodes 130A-D may include one or more dedicated memories or buffers and/or may include one or more packet processors. Since the ingress nodes 120A-D and the egress nodes 130A-D include dedicated memories, the system 105 may not be limited by memory throughput limitations, and therefore may be highly scalable and able to provide high bandwidth aggregation.

In operation, the ingress nodes 120A-D may transmit data to the egress nodes 130A-D or egress ports using various data transfer techniques or switching techniques, such as a store-and-forward data transfer technique and a cut-through data transfer technique, amongst others. In the store-and-forward data transfer technique, an ingress port associated with an ingress node A 120A may receive data segments of a data packet, such as data segments of a multicast frame. The ingress node A 120A may store the data segments in a memory or a buffer within the ingress node A 120A until the entire multicast frame has been received. Once the entire multicast frame has been received and stored in the memory of the ingress node A 120A, the ingress node A 120A may forward the multicast frame to one or more egress nodes 130A-D. The ingress node A 120A may replicate the multicast frame, e.g. create copies of the multicast frame, as necessary, for transmission to the egress nodes 130A-D, such as when the multicast frame is to be transmitted to multiple egress nodes 130A-D. The multicast frame may be received and stored by the egress nodes 130A-D, and may be replicated again, e.g. copied again, by the egress nodes 130A-D, if necessary, for transmission over the appropriate egress ports, such as when the multicast frame is to be transmitted over multiple egress ports that are associated with an egress node A 130A.

In the cut-through data transfer technique, an ingress port associated with an ingress node A 120A may receive data segments of a data packet, such as portions of a multicast frame. The ingress node A 120A may transmit the portions of the multicast frame to one or more egress nodes 130A-D without storing the data segments, or the entire multicast frame, in an internal buffer or memory of the ingress node A 120A. The ingress node 120A may replicate the portions of the multicast frame, as necessary, for transmission to the egress nodes 130A-D. The portions of the multicast frame may be received and processed by the egress nodes 130A-D, and may be replicated again by the egress nodes 130A-D, if necessary, for transmission over the appropriate egress ports without being stored in an internal buffer or memory of the egress nodes 130A-D. Thus, when using a cut-through data transfer technique in the system 105, received portions of a multicast frame can be replicated and transmitted to the egress nodes 130A-D without being stored in the memory buffer of the ingress node A 120, and the multicast frame can be replicated and transmitted over the destination egress ports associated with the egress nodes 130A-D without being stored in the memories of the egress nodes 130A-D. Since multicast frames can be transmitted from ingress ports to egress ports without being stored in the memory buffers of the ingress nodes 120A-D or the egress nodes 130A-D, the latency associated with handling these multicast frames may be substantially minimized.

The system 105 may also implement a policy based selection of the data transfer technique used to handle incoming multicast traffic at the ingress nodes 120A-D on a per ingress node basis and/or on a per ingress port basis. In one or more implementations, a policy that is associated with an ingress node A 120A and/or a port associated with the ingress node A 120A may indicate which multicast traffic, or which multicast flows, should be processed using the cut-through data transfer technique, and which multicast traffic, or which multicast flows, should be processed using the store and forward data transfer technique, or any other data transfer technique. In this manner, a policy may be set such that multicast traffic that requires minimal latency, such as book values in a high frequency trading system, can be handled at an ingress node A 120A using the cut-through switching technique, while other incoming traffic received over the same ingress port and/or at same ingress node A 120A for which latency is not a concern, such as control traffic, may be handled using the store and forward data transfer technique. In one or more implementations, the ingress node A 120A may handle some copies of a multicast packet using the cut-through switching technique, e.g. for copies of the multicast packet that are being transmitted to egress nodes 130A-D that are associated with destination egress ports that are cut-through eligible, while storing a single copy of the multicast packet in a buffer for transmission to the destination egress ports that are not cut-through eligible.

The system 105 may also implement a separate local policy based selection of the data transfer technique used to handle multicast traffic at the egress nodes 130A-D on a per egress node basis and/or a per egress port basis. In one or more implementations, a local decision may be made at an egress node A 130A as to whether a given multicast frame should be handled using the cut-through data transfer technique, the store and forward data transfer technique, or any other data transfer technique. The local decision at the egress node A 130A may be based on one or more factors, such as whether cut-through is enabled for the egress node A 130A and/or the egress port, whether the destination egress port is empty such that two multicast frames are not transmitted to the egress port simultaneously, and/or whether the speed of the ingress port at which the multicast frame was received matches the speed of the egress port such that over-run and under-run are avoided. In one or more implementations, the egress node A 130A may handle some copies of a multicast packet using the cut-through switching technique, e.g. for copies of the multicast packet that are being transmitted to destination egress ports that are cut-through eligible, while storing a single copy of the multicast packet in a buffer for transmission to the destination egress ports that are not cut-through eligible.

In one or more implementations, multicast traffic that is handled by the system 105 using the cut-through data transfer technique may be provisioned, or engineered, such that the traffic bandwidth is bound by a maximum rate. In this manner, it may be possible to ensure that the egress nodes 130A-D and/or the egress ports do not become oversubscribed when bypassing the memory buffers of the ingress nodes 120A-D and/or the memory buffers of the egress nodes 130A-D. For example, in high frequency trading applications, book values may be received at a substantially constant rate, or a substantially low rate relative to the ingress port bandwidth. In this example, since the multicast traffic is received at a substantially constant rate or substantially low rate, the multicast traffic may be handled using the cut-through data transfer technique without oversubscribing the egress ports.

Figure 2:
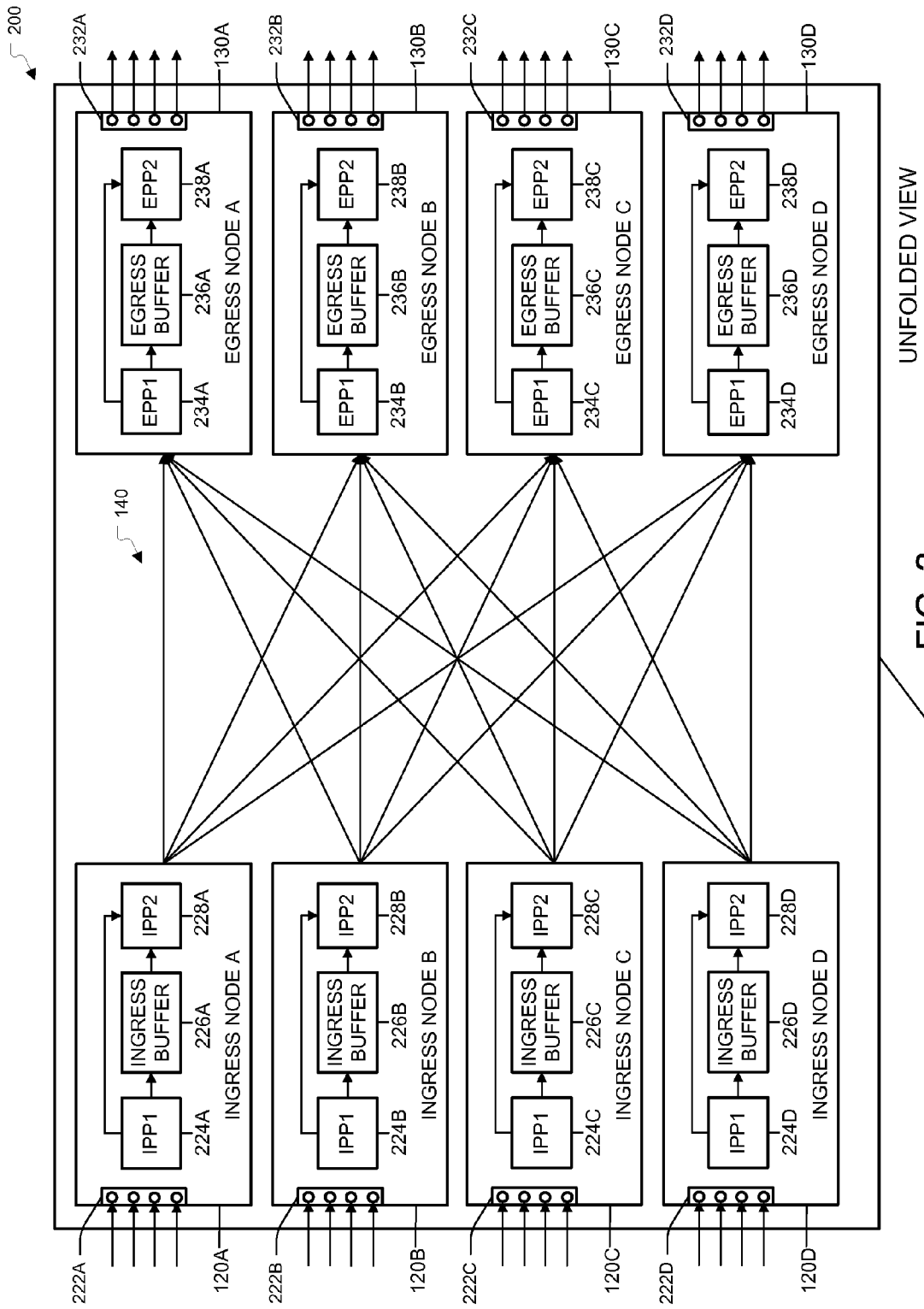
FIG. 2 illustrates an unfolded view of an example system for multicast switching for distributed devices in accordance with one or more implementations.

FIG. 2 illustrates an unfolded view 200 of an example system 205 for multicast switching for distributed devices in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The system 205 includes one or more ingress nodes 120A-D, one or more egress nodes 130A-D, and an interconnect 140. The ingress nodes 120A-D may include, or may be associated with, one or more first ingress packet processors (IPP1) 224A-D, one or more ingress buffers 226A-D, one or more second ingress packet processors (228A-D), and one or more ingress ports 222A-D. The egress nodes 130A-D may include, or may be associated with, one or more first egress packet processors (EPP1) 234A-D, one or more egress buffers 236A-D, one or more second egress packet processors (EPP2) 238A-D, and one or more egress ports 232A-D. The interconnect 140 may be any mesh or interconnect, such as a full mesh, and may provide for communication between any of the ingress nodes 120A-D and any of the egress nodes 130A-D. In one or more implementations, the ingress ports 222A-D and the egress ports 232A-D may be the same physical ports that are logically distinguished as the ingress ports 222A-D, such as when receiving data at or through the physical ports, and the egress ports 232A-D, such as when transmitting data at or through the physical ports.

In operation, an ingress node A 120A may receive a portion of a multicast frame, such as a header associated with a multicast frame, at or through one of the ingress ports 222A. The ingress node A 120A may classify the frame based on the received portion of the multicast frame. The ingress node A 120A may determine whether to the handle the frame using the cut-through data transfer technique or the store-and-forward data transfer technique based on the classification. The ingress node A 120A may handle the multicast frame using the determined technique and may forward the multicast frame, or the portion thereof, to one or more egress nodes 130A-D that correspond to a destination of the multicast frame, e.g. that are associated with an egress port that is in communication with a device that is associated with a destination address of the multicast frame.

In one or more implementations, if the ingress node A 120A handles the multicast frame using the store-and-forward technique, the multicast frame may be received in its entirety and stored in the ingress buffer 226A before being forwarded to the one or more egress nodes 130A-D. Alternatively, if the ingress node A 120A handles the multicast frame using the cut-through data transfer technique, the received portion of the multicast frame, and any subsequently received portions of the multicast frame, may be transmitted from the IPP1 224A directly to the IPP2 228A, thereby bypassing the ingress buffer 226A. The ingress node A 120A may replicate the multicast frame, or the portions thereof, as necessary for transmission to the one or more egress nodes 130A-D. In one or more implementations, an ingress node A 120A may bypass the ingress buffer 226A for copies of a multicast frame that are being transmitted to egress nodes 130A-D that are associated with destination egress ports 232A-D that are cut-through eligible, while storing a single copy of the multicast frame in the ingress buffer 226A for transmission to egress nodes 130A-D that are associated with destination egress ports 232A-D that are not cut-through eligible. Example operations of the ingress node A 120A, in one or more implementations, are described further below with respect to FIG. 4 and FIG. 5.

One or more egress nodes 130A-D, such as egress node A 130A, may receive the entire multicast frame, or the portions thereof, as they are transmitted from the ingress port A 120A. The egress node A 130A may determine whether to handle the multicast frame using the store-and-forward data transfer technique, the cut-through data transfer technique, or any other data transfer technique, based on one or more criteria locally relevant to the egress node A 130A, such as whether cut-through is enabled for the egress node A 130A and/or the one or more destination egress ports, whether the one or more destination egress ports are empty, and/or whether the speed of the ingress port at which the multicast frame was received matches the speed of the one or more destination egress ports. The egress node A 130A may handle the multicast frame using the determined technique and may forward the multicast frame, or the portions thereof, to the one or more destination egress ports over which the multicast frame is to be transmitted.

In one or more implementations, if the egress node A 130A handles the multicast frame using the store-and-forward technique, the multicast frame may be received in its entirety and stored in the egress buffer 236A before being transmitted over the destination egress ports. Alternatively, if the egress node A 130A handles the multicast frame using the cut-through data transfer technique, the received portions of the multicast frame may be transmitted from the EPP1 234A directly to the EPP2 238A, thereby bypassing the egress buffer 236A. In one or more implementations, an egress node A 130A may bypass the egress buffer 236A for copies of a multicast frame that are being transmitted to destination egress ports 232A that are cut-through eligible, while storing a single copy of the multicast frame in the egress buffer 236A for transmission to the destination egress ports 232A that are not cut-through eligible. Example operations of the egress node A 130A, in one or more implementations, are described further below with respect to FIG. 4 and FIG. 6.

Figure 3:
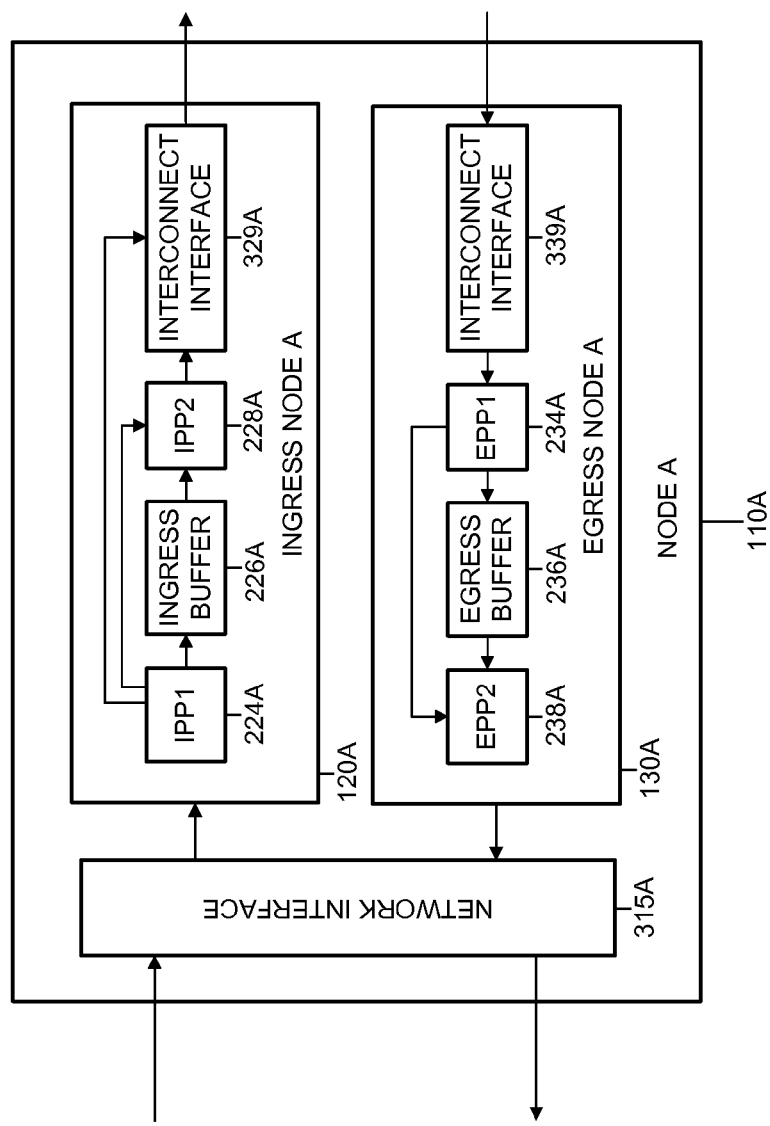
FIG. 3 illustrates a folded view of an example node in a system for multicast switching for distributed devices in accordance with one or more implementations.

FIG. 3 illustrates a folded view 300 of an example node A 110A for multicast switching for distributed devices in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The node A 110A may include an ingress node A 120A, an egress node A 130A, and a network interface 315A. The ingress node A 120A may include a first ingress packet processor (IPP1) 224A, an ingress buffer 226A, a second ingress packet processor (IPP2) 228A, and an interconnect interface 329A. The egress node A 130A may include a first egress packet processor (EPP1) 234A, an egress buffer 236A, a second egress packet processor (EPP2) 238A, and an interconnect interface 339A.

In operation, a portion of a multicast frame, such as a cell, may be received at or through an ingress port that is in communication with the network interface 315A. The portion of the multicast frame may be provided to the IPP1 224A. The IPP1 224A may determine a classification of the multicast frame, based on the received portion, and may determine a data transfer technique for handling the multicast frame based on the classification. If the IPP1 224A determines that the multicast frame should be handled using the cut-through data transfer technique, the IPP1 224A may provide the received portion of the multicast frame, and any subsequently received portions, directly to the IPP2 228A, or the interconnect interface 329A. If the IPP1 224A determines that the multicast frame should be handled using the store-and-forward data transfer technique, the IPP1 224A may receive and store the multicast frame, in its entirety, in the ingress buffer 226A. The IPP2 228A may then retrieve the multicast frame from the ingress buffer 226A. IPP2 228A and/or interconnect interface 329A may determine one or more egress nodes 130A-D that the multicast frame, or the portions thereof, should be transmitted to, such as based on the multicast address of the multicast frame. The IPP2 228A may replicate the multicast frame, or the portions thereof, if necessary, such as if the multicast frame is being transmitted to more than one egress node 130A-D. The multicast frame, or portions thereof, may then be transmitted to the appropriate egress nodes 130A-D through the interconnect.

The egress nodes 130A-D, such as egress node A 130A, may receive the multicast frame and/or the portions thereof, through the interconnect interface 339A. The EPP1 238A may determine whether to handle the received multicast frame using the store-and-forward data transfer technique, or the cut-through data transfer technique, based on one or more criteria associated with the egress node A 130A. If the EPP1 determines that the multicast frame, or received portion, should be handled using the cut-through data transfer technique, the EPP1 234A may provide the received portion of the multicast frame, and any subsequently received portions of the multicast frame, directly to the EPP2 238A. If the multicast frame is handled using the store-and-forward data transfer technique, then the EPP1 238A may receive and store the multicast frame, in its entirety, in the egress buffer 236A. The EPP2 238A may then retrieve the multicast frame from the egress buffer 236A. EPP2 238A may determine one or more egress ports that the multicast frame should be transmitted to, such as based on the multicast address of the multicast frame.

The EPP2 238A may replicate the multicast frame, or the portions thereof, if necessary. The multicast frame, or portions thereof, may then be transmitted to the appropriate egress ports through the network interface 315A.

Figure 4:
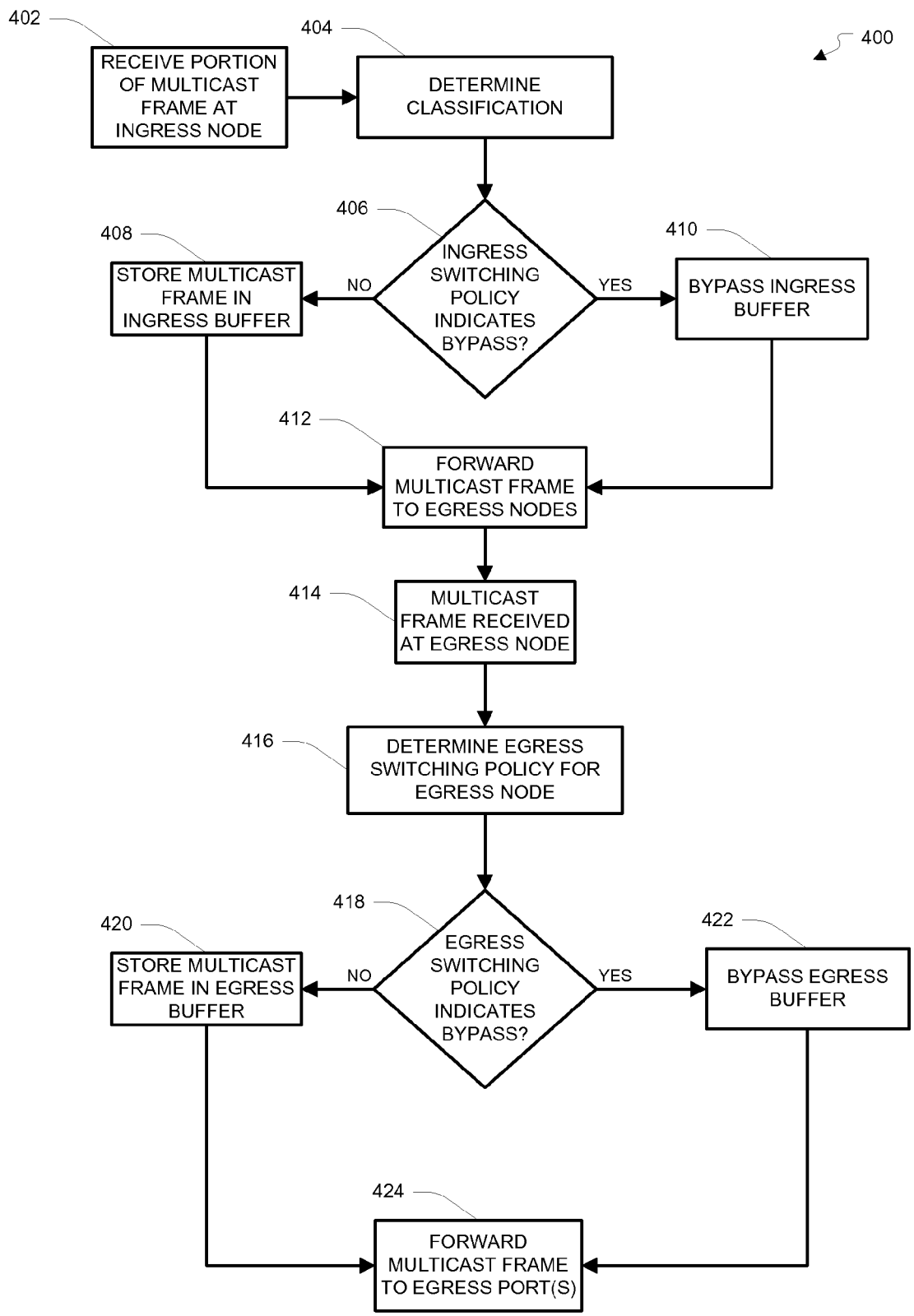
FIG. 4 illustrates a flow diagram of an example process for multicast switching for distributed devices in accordance with one or more implementations.

FIG. 4 illustrates a flow diagram of example process 400 for multicast switching for distributed devices in accordance with one or more implementations. For explanatory purposes, example process 400 is described herein with reference to example system 105 of FIG. 1, example system 205 of FIG. 2, and/or example node A 110A of FIG. 3; however, example process 400 is not limited to example system 105 of FIG. 1, example system 205 of FIG. 2, and/or example node A 110A of FIG. 3. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

A system for multicast switching for distributed devices, such as system 105, receives a portion of a multicast frame at or over an ingress port that is associated with an ingress node, such as one of the ingress ports 222A of the ingress node A 120A (402). The ingress node A 120A, or a component thereof, such as the first ingress packet processor (IPP1) 224A, determines a classification of the multicast frame, such as by processing the received portion of the multicast frame (404). In one or more implementations, the classification of the multicast frame may be determined based on a data flow or a traffic flow to which the multicast frame belongs, a destination of the multicast frame, a source of the multicast frame, or generally based on any information available in the received portion of the multicast frame.

The ingress node A 120A, or a component thereof, such as IPP1 224A, determines whether an ingress switching policy, or an ingress criteria, of the ingress node A 120A indicates that an ingress buffer 226A of the ingress node A 120A should be bypassed for the multicast frame, e.g. whether the multicast frame should be handled using a cut-through data transfer technique (406). In one or more implementations, the ingress switching policy may be configured by a user, such as an administrator. The ingress switching policy of the ingress node A 120A may indicate, for various classifications of received multicast data packets or received multicast frames, the data transfer technique that should be used to handle the multicast data packets and/or the corresponding multicast frame. If the IPP1 224A of the ingress node A 120A determines, based on the ingress switching policy, that the ingress buffer 226A should be bypassed, e.g. that the cut-through data transfer technique should be implemented, the multicast frame is forwarded directly to the IPP2 228A or the interconnect interface 329A of the ingress node A 120A (410). If the IPP1 224A of the ingress node A 120A determines that the multicast frame should be stored in the ingress buffer 226A, e.g. that the store-and-forward data transfer technique should be implemented, then the multicast frame, in its entirety, is stored in the ingress buffer 226A (408).

The ingress node A 120A, or a component thereof, such as the IPP2 228A or the interconnect interface 329A, forward the multicast frame, or the portions thereof, to the egress nodes 130A-D that are associated with the egress ports 232A-D over which the multicast frame is to be transmitted (412). If the multicast frame is stored in the ingress buffer 226A, then the IPP2 228A retrieves the multicast frame from the ingress buffer 226A and then forward the multicast frame to the appropriate egress nodes 130A-D. If the multicast frame, or portion thereof, is being forwarded to multiple egress nodes 130A-D, then the IPP2 228A, may replicate the multicast frame, or portion thereof, for forwarding to multiple egress nodes 130A-D.

The multicast frame, or portions thereof, are received at an egress node, such as egress node A 130A (414). The egress node A 130A, or a component thereof, such as first egress packet processor (EPP1) 234A, determine the egress switching policy for the egress node A 130A (416). The egress switching policy may be based on one or more factors that are locally relevant to the egress node A 130A, such as whether cut-through data transfer is enabled for the egress node A 130A, whether the one or more destination egress ports are empty, whether the speed of the ingress port at which the data was received matches the speeds of the one or more destination egress ports, or any other factors that are locally relevant to the egress node A 130A.

The egress node A 130A, or a component thereof, such as EPP1 234A, determines whether the current egress switching policy indicates that the received multicast frame, or portion thereof, should be stored in the egress buffer 236A, e.g. the store-and-forward data transfer technique, or whether the egress buffer 236A should be bypassed for the multicast frame, e.g. the cut-through data transfer technique. If the EPP1 234A determines that the egress buffer 236A should be bypassed (418), then the multicast frame, or portion thereof, is transmitted directly to the second egress packet processor (EPP2) 238A, thereby bypassing the egress buffer 236A (422). If the EPP1 234A determines that the multicast frame should be stored in the egress buffer 236A, then the EPP1 234A stores the multicast frame, in its entirety, in the egress buffer 236A (420).

The egress node A 130A, or a component thereof, such as the EPP2 238A, forwards the multicast frame, or portions thereof, to the egress ports 232A over which the multicast frame is to be transmitted (424), e.g. the egress ports 232A that are in communication with servers 150A-B, or computers 160A-B that are associated with a multicast address of the multicast frame. If the multicast frame is stored in the egress buffer 236A, then the EPP2 238A retrieves the multicast frame from the egress buffer 236A and then forwards the multicast frame to the egress ports 232A. If the multicast frame, or portion thereof, is being forwarded to multiple egress ports 232A, then the egress node A 130A, or a component thereof, such as EPP2 238A, may replicate the multicast frame, or portion thereof, for forwarding to the multiple egress ports 232A.

For explanatory purposes, the process of handling the multicast frame, or portion thereof, by the egress node A 130A (414-424) is described herein with reference to a single egress node A 130A. However, in one or more implementations, the multicast frame, or portion thereof, may be forwarded by the ingress node A 120A to multiple egress nodes 130A-D. In these one or more implementations, the egress nodes 130A-D may individually handle the received multicast frame as described herein (414-424).

Figure 5:
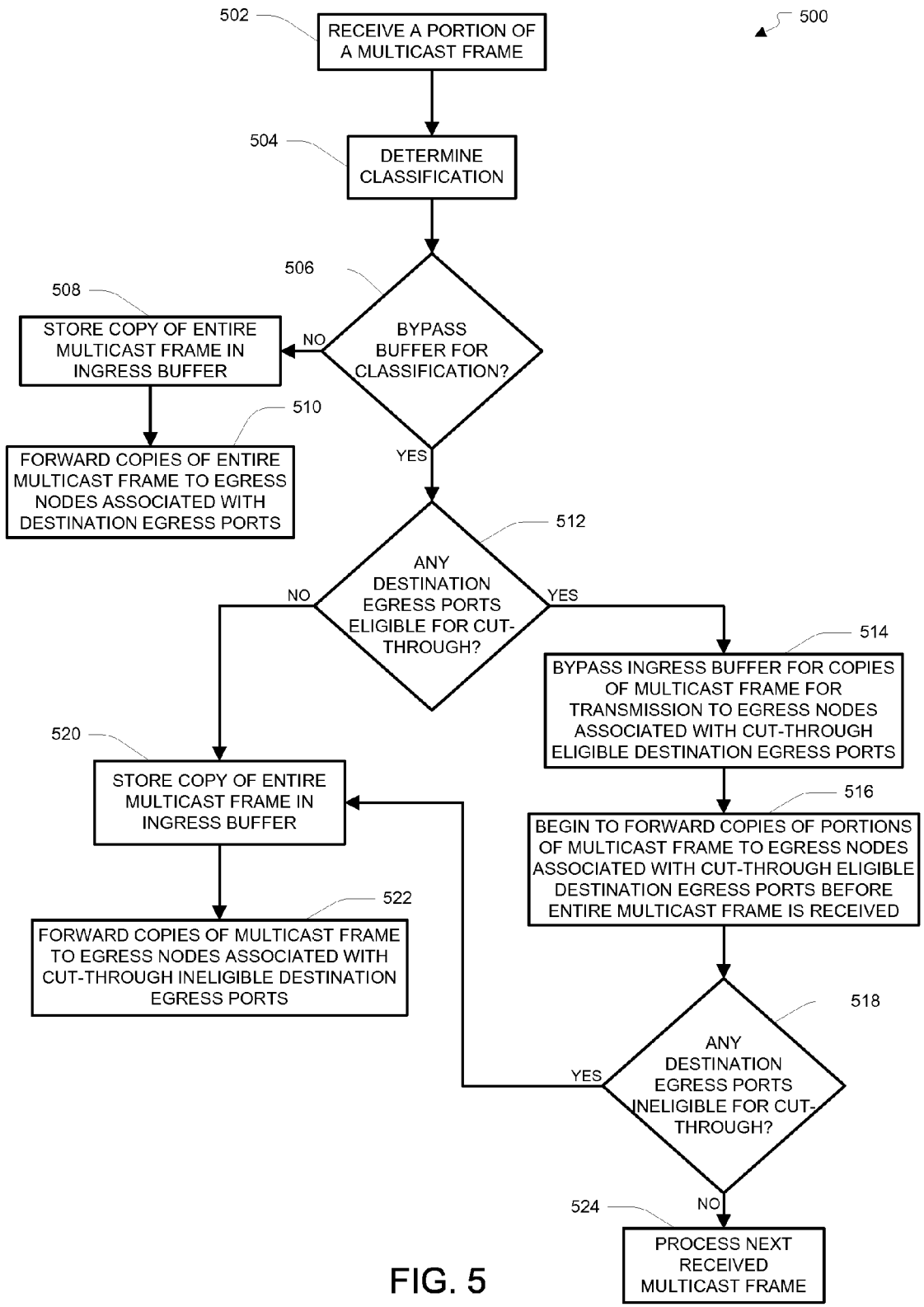
FIG. 5 illustrates a flow diagram of an example process performed at an ingress node of a system for multicast switching for distributed devices in accordance with one or more implementations.

FIG. 5 illustrates a flow diagram of example process 500 performed at an ingress node of a system for multicast switching for distributed devices in accordance with one or more implementations. For explanatory purposes, example process 500 is described herein with reference to example system 105 of FIG. 1, example system 205 of FIG. 2, and/or example node A 110A of FIG. 3; however, example process 500 is not limited to example system 105 of FIG. 1, example system 205 of FIG. 2, and/or example node A 110A of FIG. 3. Further for explanatory purposes, the blocks of example process 500 are described herein as occurring in serial, or linearly. However, multiple blocks of example process 500 may occur in parallel.

In addition, the blocks of example process 500 need not be performed in the order shown and/or one or more of the blocks of example process 500 need not be performed.

An ingress node, such as the ingress node A 120A, or a component thereof, may receive a portion of a multicast frame (502), such as over an ingress port 222A that is associated with the ingress node A 120A. The ingress node A 120A, or a component thereof, such as the first ingress packet processor (IPP1) 224A, may determine a classification of the multicast frame based on the received portion of the multicast frame (504), such as by using a packet classifier or a similar classifier. The IPP1 224A may determine the classification of the multicast frame based on any information determinable from the received portion of the multicast frame.

The IPP1 224A may determine whether cut-through switching is associated with the determined classification of the multicast frame, e.g. whether the ingress buffer 226A of the ingress node A 120A should be bypassed (506) for the multicast frame and other traffic in the same classification as the multicast frame. In one or more implementations, the ingress node A 120A may identify a different data transfer technique, such as a cut-through data transfer technique, a store-and-forward data transfer technique, or generally any data transfer technique, for each class of traffic.

If the IPP1 224A determines that the ingress buffer 226A should not be bypassed for the classification of the multicast frame, the IPP1 224A stores a copy of the multicast frame, in its entirety, in the ingress buffer 226A (508). Once the entire multicast frame is stored in the ingress buffer 226A, the IPP2 228A retrieves the multicast frame from the ingress buffer 226A, replicates the multicast frame (in one or more implementations), and forwards copies of the multicast frame to one or more of the egress nodes 130A-D, e.g. the egress nodes 130A-D that are associated with the destination egress ports 232A-D over which the multicast frame is to be transmitted (510). The IPP2 228A may process the multicast frame prior to forwarding the multicast frame, such as by performing a verification check on the multicast frame, in order to prevent an invalid frame from being propagated through the system 105.

If the IPP1 224A determines that the ingress buffer 226A should be bypassed for the determined classification of the multicast frame (506), the IPP1 224A determines whether any destination egress ports 232A-D corresponding to the multicast frame are eligible for cut-through switching, e.g. cut-through eligible (512). Example operations for determining whether any destination egress ports 232A-D are cut-through eligible are discussed further below with respect to FIG. 6. If the IPP1 224A determines that none of the destination egress ports 232A-D are cut-through eligible (512), the IPP1 224A stores a copy of the multicast frame, in its entirety, in the ingress buffer 226A (520). Once the entire multicast frame is stored in the ingress buffer 226A, the IPP2 228A retrieves the multicast frame from the ingress buffer 226A, replicates the multicast frame (in one or more implementations) and forwards copies of the multicast frame to the egress nodes 130A-D that are associated with the destination egress ports 232A-D that are not eligible for cut-through, e.g. cut-through ineligible (522).

If the IPP1 224A determines that one or more of the destination egress ports 232A-D are cut-through eligible (512), copies of the received portion of the multicast frame, and any subsequently received portions of the multicast frame, are forwarded directly to the second ingress packet processor (IPP2) 228A or the interconnect interface 329A of the ingress node A 120A (514). The IPP2 228A or the interconnect interface 329A forwards copies of the received portion of the multicast frame, and copies of any subsequently received portions of the multicast frame, to the one or more egress nodes 130A-D that are associated with the one or more destination egress ports 232A-D that are cut-through eligible, before the entire multicast frame is received (516).

The IPP1 224A determines whether there are any remaining destination egress ports 232A-D that are not eligible for cut-through, e.g. whether a subset of the destination egress ports 232A-D are not eligible for cut-through (518). If the IPP1 224A determines that there are any destination egress ports 232A-D that are not eligible for cut-through (518), the IPP1 224A stores a copy of the multicast frame, in its entirety, in the ingress buffer 226A (520), and once the entire multicast frame is stored in the ingress buffer 226A, the IPP2 228A retrieves the multicast frame from the ingress buffer 226A, replicates the multicast frame (in one or more implementations) and forwards copies of the multicast frame to the egress nodes 130A-D that are associated with egress ports 232A-D that are not eligible for cut-through (522). In one or more implementations, the IPP2 228A may not forward a copy of the multicast frame to any egress node 130A-D that previously received a copy of the multicast frame via cut-through switching. If the IPP1 224A determines that there are no destination egress ports 232A-D that are not eligible for cut-through (518), the IPP1 224A may begin to process the next received multicast frame, or next received portion thereof (524).

Figure 6:
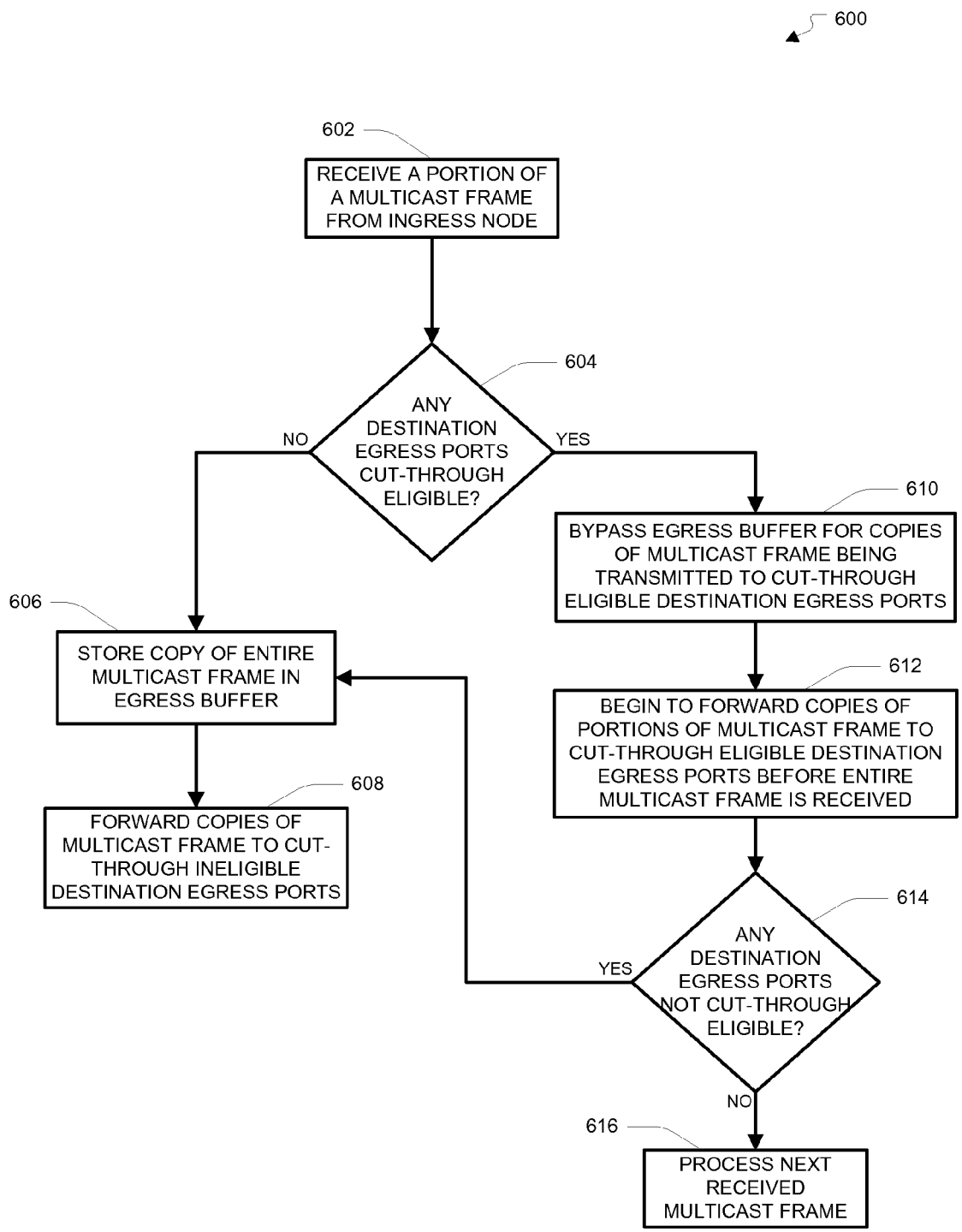
FIG. 6 illustrates a flow diagram of an example process performed at an egress node of a system for multicast switching for distributed devices in accordance with one or more implementations.

FIG. 6 illustrates a flow diagram of an example process 600 performed at an egress node of a system for multicast switching for distributed devices in accordance with one or more implementations. For explanatory purposes, example process 600 is described herein with reference to example system 105 of FIG. 1, example system 205 of FIG. 2, and/or example node A 110A of FIG. 3; however, example process 600 is not limited to example system 105 of FIG. 1, example system 205 of FIG. 2, and/or example node A 110A of FIG. 3. Further for explanatory purposes, the blocks of example process 600 are described herein as occurring in serial, or linearly. However, multiple blocks of example process 600 may occur in parallel. In addition, the blocks of example process 600 need not be performed in the order shown and/or one or more of the blocks of example process 600 need not be performed.

An egress node, such as the egress node A 130A, or a component thereof, such as the interconnect interface 339A, receives a multicast frame, or a portion thereof, such as from an ingress node A 120A (602). The egress node A 130A, or a component thereof, such as the first egress packet processor (EPP1) 234A, determines whether any destination egress ports 232A are cut-through eligible, e.g. whether one or more cut-through criteria are satisfied for any of the destination egress ports 232A (604). The cut-through criteria may include one or more factors that are locally relevant to the egress node A 130A, such as whether cut-through is enabled for the egress node A 130A and/or any of the destination egress ports 232A, whether any of the destination egress ports 232A are empty, whether the speed of the ingress port over which the multicast frame was received matches the speed of any of the destination egress ports 232A, or generally any factors that may be locally relevant to the egress node A 130A. In one or more implementations, the cut-through criteria may also include factors that are globally relevant to the system 205, and/or factors that are external to the system 205.

If the EPP1 234A determines that none of the destination egress ports 232A are cut-through eligible (604), the EPP1 234A stores a copy of the entire multicast frame in the egress buffer 236A (606). After the entire multicast frame has been stored in the egress buffer 236A, the EPP2 238A may retrieve the multicast frame from the egress buffer 236A and forward copies of the multicast frame to the one or more cut-through ineligible destination egress ports 232A at or through which the multicast frame is to be transmitted (608). The EPP2 238A may process the multicast frame prior to forwarding the multicast frame, such as by performing a verification check on the multicast frame, in order to prevent an invalid frame from being propagated out of the system 105.

If the EPP1 234A determines that any of the destination egress ports 232A are cut-through eligible (604), copies of the received multicast frame, or portion thereof, and any subsequently received portions, are forwarded directly to the second egress packet processor (EPP2) 238A of the egress node A 130A, or the network interface 315A of the egress node A 130A, thereby bypassing the egress buffer 236A (610). The EPP2 238A or the network interface 315A forwards the copies of the received multicast frame, or portion thereof, and any subsequently received portions of the multicast frame, to the one or more cut-through eligible destination egress ports 232A at or through which the multicast frame is to be transmitted (612).

The EPP1 234A determines whether there are any remaining destination egress ports 232A that are not eligible for cut-through, e.g. whether a subset of the destination egress ports 232A are not eligible for cut-through (614). If the EPP1 234A determines that there are any destination egress ports 232A that are not eligible for cut-through (614), the EPP1 234A stores a copy of the multicast frame, in its entirety, in the egress buffer 236A (606), and once the entire multicast frame is stored in the egress buffer 236A, the EPP2 238A retrieves the multicast frame from the egress buffer 236A, replicates the multicast frame (in one or more implementations) and forwards copies of the multicast frame to the one or more cut-through ineligible destination egress ports 232A at or through which the multicast frame is to be transmitted (608). If the EPP1 234A determines that there are no destination egress ports 232A that are not eligible for cut-through (614), the EPP1 234A may begin to process the next received multicast frame, or next received portion thereof (616).

Figure 7:
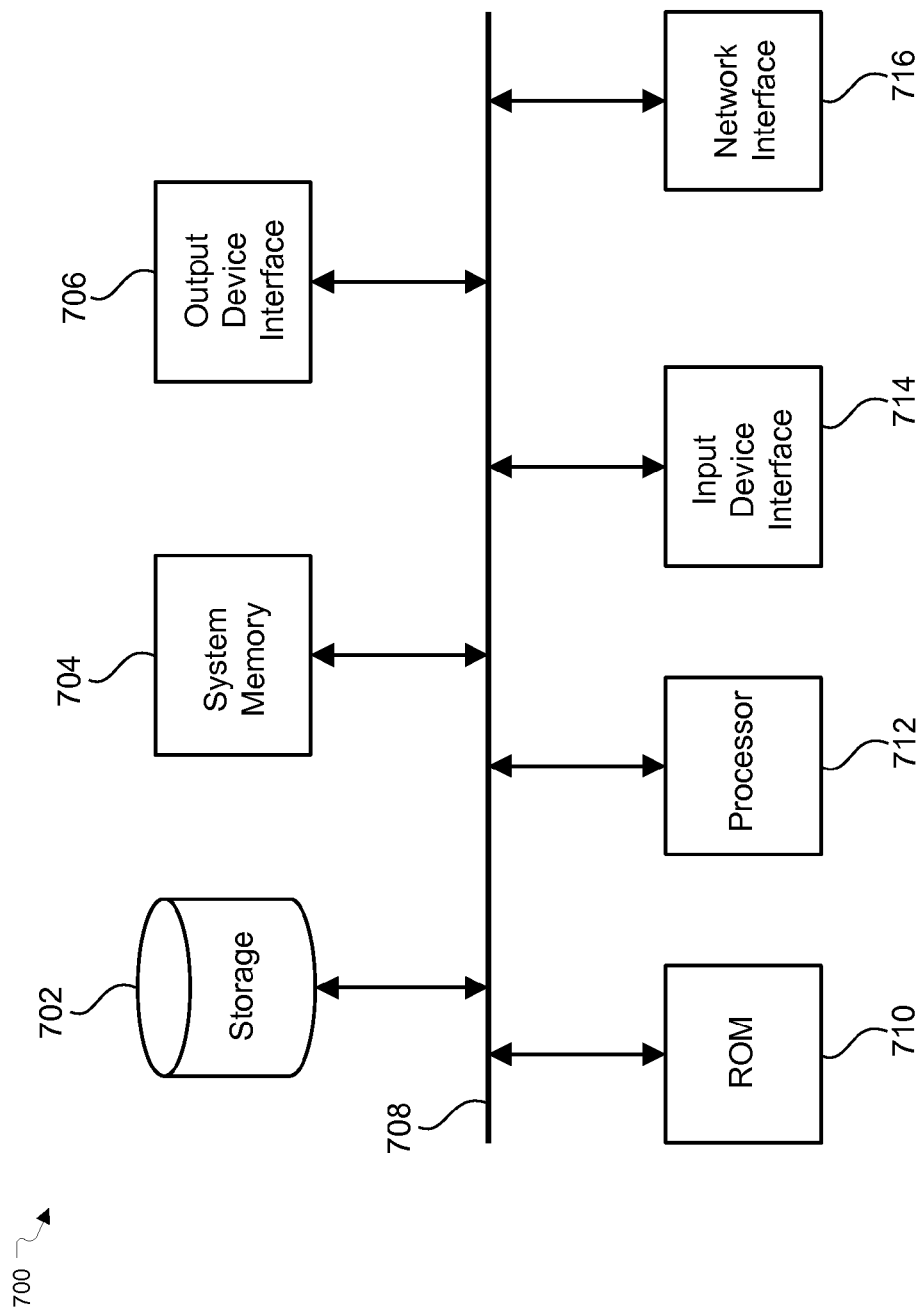
FIG. 7 conceptually illustrates an electronic system with which any implementations of the subject technology may be implemented.

FIG. 7 conceptually illustrates electronic system 700 with which any implementations of the subject technology are implemented. Electronic system 700, for example, can be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 700 includes bus 708, processing unit(s) 712, system memory 704, read-only memory (ROM) 710, permanent storage device 702, input device interface 714, output device interface 706, and network interface 716, or subsets and variations thereof.

Bus 708 collectively represents all system, peripheral, and chipset buses that communicatively connect the numerous internal devices of electronic system 700. In one or more implementations, bus 708 communicatively connects processing unit(s) 712 with ROM 710, system memory 704, and permanent storage device 702. From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. One or more implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores any of the instructions and data that processing unit(s) 712 needs at runtime. In one or more implementations, the processes of the subject disclosure are stored in system memory 704, permanent storage device 702, and/or ROM 710. From these various memory units, processing unit(s) 712 retrieves instructions to execute and data to process in order to execute the processes of one or more implementations.

Bus 708 also connects to input and output device interfaces 714 and 706. Input device interface 714 enables a user to communicate information and select commands to the electronic system. Input devices used with input device interface 714 include, for example, alphanumeric keyboards and pointing devices (also called "cursor control devices"). Output device interface 706 enables, for example, the display of images generated by electronic system 700. Output devices used with output device interface 706 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, bus 708 also couples electronic system 700 to a network (not shown) through network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for multicast switching for distributed devices, the method comprising:
   receiving a multicast frame at an ingress node of a network device, wherein the ingress node comprises an ingress buffer dedicated to the ingress node and the ingress node is associated with an ingress switching policy;
   determining, based on a classification of the multicast frame, whether the ingress switching policy associated with the ingress node indicates that the multicast frame should be stored in the ingress buffer of the ingress node;
   storing the multicast frame in the ingress buffer associated with the ingress node when the ingress switching policy associated with the ingress node indicates that the multicast frame should be stored in the ingress buffer of the ingress node, otherwise bypassing the ingress buffer of the ingress node;
   forwarding the multicast frame to a plurality of egress nodes of the network device, each of the plurality of egress nodes comprising a dedicated egress buffer, wherein each of the plurality of egress nodes is associated with a separate egress switching policy that is configurable independently of the ingress switching policy;
   determining, for each of the plurality of egress nodes, whether to store the multicast frame in the egress buffer of each of the plurality of egress nodes based on the egress switching policy;
   storing, for each of the plurality of egress nodes, the multicast frame in the egress buffer of each of the plurality of egress nodes when the egress switching policy associated with each of the plurality of egress nodes indicates that the multicast frame should be stored in the egress buffer of each of the plurality of egress nodes, otherwise bypassing the egress buffer of the each of the plurality of egress nodes; and
   transmitting, by each of the plurality of egress nodes, the multicast frame to at least one egress port.

2. The method of claim 1, wherein the ingress node is associated with a plurality of ingress ports and the multicast frame is received at one of the plurality of ingress ports.

3. The method of claim 2, further comprising:
   processing a portion of the multicast frame; and
   determining the classification of the multicast frame based on the processing.

4. The method of claim 3, where in the forwarding the multicast frame to the plurality of egress nodes of the network device further comprises forwarding the multicast frame to the plurality of egress nodes of the network device prior to receiving an entirety of the multicast frame, when the ingress buffer of the ingress node is bypassed.

5. The method of claim 4, wherein the forwarding the multicast frame to the plurality of egress nodes of the network device further comprises replicating the multicast frame a number of times that corresponds to a number of the plurality of egress nodes.

6. The method of claim 5, wherein the determining, for each of the plurality of egress nodes, whether to store the multicast frame in the egress buffer of each of the plurality of egress nodes based on the egress switching policy further comprises:
   determining, for each of the plurality of egress nodes, whether the egress switching policy associated with each of the plurality of egress nodes indicates that the multicast frame should be stored in the dedicated egress buffer of each of the plurality of egress nodes based on at least one of:
      whether the at least one egress port of each of the plurality of egress nodes is empty,
      whether cut-through switching is enabled for the at least one egress port of each of the plurality of egress nodes, or
      whether a speed of the one of the plurality of ingress ports at which the multicast frame was received is equivalent to a speed of the at least one egress port of each of the plurality of egress nodes.

7. The method of claim 6, wherein the transmitting, by each of the plurality of egress nodes, the multicast frame to the at least one egress port further comprises replicating the multicast frame a number of times that corresponds to a number of the at least one egress port.

8. The method of claim 2, further comprising receiving multicast traffic comprising the multicast frame at the one of the plurality of ingress ports at a rate that does not exceed a maximum rate.

9. The method of claim 1, wherein the network device comprises a switch device.

10. A system for multicast switching for distributed devices, comprising:
   an ingress node comprising an ingress memory, wherein the ingress node is associated with an ingress port; and
   a first egress node comprising a first egress memory dedicated to the first egress node, wherein the first egress node is associated with a first egress port and the first egress node is communicatively coupled to the ingress node;
   where the ingress node is operable to receive a portion of a multicast frame over the ingress port, bypass the ingress memory and provide the portion of the multicast frame to the first egress node when the portion of the multicast frame satisfies an ingress criteria, otherwise receive and store the multicast frame in the ingress memory and then provide the multicast frame to the first egress node; and
   where the first egress node is operable to receive the portion of the multicast frame from the ingress node, bypass the first egress memory for the portion of the multicast frame and provide the portion of the multicast frame to the first egress port when a first egress criteria is satisfied, otherwise receive and store the multicast frame in the first egress memory and then provide the multicast frame to the first egress port, wherein the first egress criteria is separate from the ingress criteria.

11. The system of claim 10, further comprising:
   a second egress node comprising a second egress memory dedicated to the second egress node, wherein the second egress node is associated with a second egress port and the second egress node is communicatively coupled to the ingress node;

where the second egress node is operable to receive the multicast frame from the ingress node, bypass the second egress memory for the portion of the multicast frame and provide the portion of the multicast frame to the second egress port when a second egress criteria is satisfied, otherwise receive and store the multicast frame in the second egress memory and then provide the multicast frame to the second egress port.

12. The system of claim 10, wherein the first egress node is further associated with a second egress port, and the first egress node is operable to provide the multicast frame to the first egress port and the second egress port.

13. The system of claim 10, wherein the ingress node is further operable to:

process the portion of the multicast frame; and determine a classification of the multicast frame based on the processing, wherein the classification of the multicast frame is determinative of whether the multicast frame satisfies the ingress criteria.

14. The system of claim 10, wherein the ingress node is further operable to:

provide the portion of the multicast frame to the first egress port before an entirety of the multicast frame is received when the multicast frame satisfies the ingress criteria; and provide the multicast frame to the first egress port after the entirety of the multicast frame is received and stored in the ingress memory when the multicast frame does not satisfy the ingress criteria.

15. The system of claim 10, wherein the first egress node is further operable to:

determine whether the first egress criteria is satisfied based on at least one of: whether the first egress port associated with the first egress node is empty, whether cut-through switching is enabled for the first egress port associated with the first egress node, or whether an ingress speed of the ingress port is equivalent to an egress speed of the first egress port associated with the first egress node.

16. The system of claim 10, wherein the ingress node is further operable to:

receive a plurality of multicast frames at a rate that does not exceed a maximum rate.

17. A non-transitory machine-readable medium embodying instructions that, when executed by a machine, cause the machine to perform a method for multicast switching for distributed devices, the method comprising:

receiving a multicast packet at an ingress node for transmission over a plurality of destination egress ports, wherein the ingress node comprises an ingress buffer dedicated to the ingress node;

determining cut-through eligible destination egress ports of the plurality of destination egress ports and cut-through ineligible destination egress ports of the plurality of destination egress ports;

bypassing the ingress buffer and forwarding first copies of the multicast packet to a first plurality of egress nodes that are associated with the cut-through eligible destination egress ports of the plurality of destination egress ports;

storing the multicast packet in the ingress buffer; and retrieving the multicast packet from the ingress buffer and forwarding second copies of the multicast packet to a second plurality of egress nodes that are associated with the cut-through ineligible destination egress ports of the plurality of destination egress ports, wherein at least one of the first and second plurality of egress nodes is associated with an individual egress switching policy that is configurable independently of whether the ingress buffer is bypassed.

18. The non-transitory machine-readable medium of claim 17, wherein the method further comprises:

receiving, at a first egress node of the first plurality of egress nodes, one of the first copies of the multicast packet, wherein the first egress node comprises an egress buffer dedicated to the first egress node and a first plurality of egress ports;

determining that the first plurality of egress ports comprises at least one of the cut-through eligible destination egress ports and at least one of the cut-through ineligible destination egress ports;

bypassing the egress buffer and forwarding a third copy of the multicast packet to the at least one of the cut-through eligible destination egress ports;

storing the one of the first copies of the multicast packet in the egress buffer; and retrieving the one of the first copies of the multicast packet from the egress buffer and forwarding the one of the first copies of the multicast packet to the at least one of the cut-through ineligible destination egress ports.

19. The non-transitory machine-readable medium of claim 17, wherein the retrieving the multicast packet from the ingress buffer and forwarding the second copies of the multicast packet to the second plurality of egress nodes that are associated with the cut-through ineligible destination egress ports of the plurality of destination egress ports further comprises:

retrieving the multicast packet from the ingress buffer and forwarding the second copies of the multicast packet to the second plurality of egress nodes that are associated with the cut-through ineligible destination egress ports of the plurality of destination egress ports and that are not associated with any of the cut-through eligible destination egress ports of the plurality of destination egress ports.

20. The non-transitory machine-readable medium of claim 17, the method further comprising:

receiving a plurality of multicast packets at the ingress node at a rate that does not exceed a maximum rate.

* * * * *